United States Patent
Nishimura

(10) Patent No.: US 6,999,082 B2
(45) Date of Patent: Feb. 14, 2006

(54) CHARACTER CODE CONVERTING SYSTEM IN MULTI-PLATFORM ENVIRONMENT, AND COMPUTER READABLE RECORDING MEDIUM HAVING RECORDED CHARACTER CODE CONVERTING PROGRAM

(75) Inventor: Takashi Nishimura, Tokyo-To (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 604 days.

(21) Appl. No.: 09/790,606

(22) Filed: Feb. 23, 2001

(65) Prior Publication Data

US 2001/0029542 A1    Oct. 11, 2001

(30) Foreign Application Priority Data

Feb. 25, 2000 (JP) .............................. 2000-049503

(51) Int. Cl.
    *G09G 5/40* (2006.01)
(52) U.S. Cl. .................................. 345/467; 345/551
(58) Field of Classification Search ................ 345/467, 345/471, 551, 468
See application file for complete search history.

(56) References Cited

U.S. PATENT DOCUMENTS 5,389,924 A * 2/1995 Ogawa ........................ 341/106
5,699,524 A * 12/1997 Ooishi et al. ................ 709/246
5,708,828 A * 1/1998 Coleman ...................... 715/523
5,802,538 A * 9/1998 Ooishi .......................... 715/542
5,890,184 A * 3/1999 Ooishi .......................... 715/542
6,016,396 A * 1/2000 Mochizuki ................... 717/149

FOREIGN PATENT DOCUMENTS

JP              7-271777        10/1995

* cited by examiner

Primary Examiner—Richard Hjerpe
Assistant Examiner—Michelle K. Lay
(74) Attorney, Agent, or Firm—Oblon, Spivak, McClelland, Maier & Neustadt, P.C.

(57) ABSTRACT

A character code converting system capable of lightening the burden imposed on the management of a code converting library and mapping information on the side of users and of easily and surely carrying out code conversion of character data including types of characters such as special characters and external characters between a plurality of different coding schemes. In the character code converting system, a code converting component carries out code conversion of character data, which are exchanged between processing programs operating on the respective platforms and an internal code converting module in a middleware, based on mapping information by an external code converting part, and processes the code-converted character data into a predetermined data format, which will be code-converted by the internal code converting module, by a data processing part. Thus, even if the internal code converting module in the middleware is operating, it is possible to equivalently transmit character data.

8 Claims, 10 Drawing Sheets

| INSERTED CHARACTER STRING | 東 | 芝 | 太 | 郎 |
|---|---|---|---|---|
| Unicode | E000 | 829D | 592A | 90CE |
| EUC | F5A1 | BCC7 | C2C0 | CFBA |

BYTE ARRAY [0] 0xF5 [1] 0xA1
[2] 0xBC [3] 0xC7
[4] 0xC2 [5] 0xC0
[6] 0xCF [7] 0xBA

FIG.10A

CHARACTER ARRAY [0] 0x00F5 [1] 0x00A1
[2] 0x00BC [3] 0x00C7
[4] 0x00C2 [5] 0x00C0
[6] 0x00CF [7] 0x00BA

CHARACTER CODE CONVERTING SYSTEM IN MULTI-PLATFORM ENVIRONMENT, AND COMPUTER READABLE RECORDING MEDIUM HAVING RECORDED CHARACTER CODE CONVERTING PROGRAM

BACKGROUND OF THE INVENTION

1. Field of The Invention

The present invention relates generally to a character code converting system realized on a multi-platform environment including a plurality of platforms. More specifically, the invention relates to a character code converting system for code-converting character data exchanged between processing programs, such as applications and middlewares, each of which operates on a corresponding one of platforms, and a computer readable recording medium in which a character code converting program has been recorded.

2. Description of The Related Art

In a typical open system, such as a Web system utilizing Internet or a conventional client/server system, a plurality of platforms having different coding schemes are mixed due to the difference in operating system or the like. In such a multi-platform environment, when a linkage between functions, such as a linkage between applications or a linkage between an application and a middleware, is carried out, it is necessary that the same character is treated as a unique character between a plurality of different coding schemes depending on the platforms, so that it is required to code-convert character data exchanged in the linkage between functions.

When an application carries out the linkage between applications via a middleware or when an application exchanges character data directly with a middleware itself, such as a data base management system (DBMS), to carry out the linkage between an application and a middleware, the character data are typically transmitted while carrying out a code conversion via a code converting module in the middleware.

In the middleware for use in such an open system as a premise, the code converting module does not often correspond to the types of characters, such as special characters (vendor-designed characters) and external characters (user-designed characters), which depend on a specific platform, and the structure in the code converting module is typically a black box.

Therefore, conventionally, for example, the transmission of special characters and external characters is individually defined by the application in a transmission source or a receiving destination to convert the special characters and external characters into predetermined character codes by means of a code converting library or the like, which is provided in each application to exchange character data via a code converting module in the middleware.

However, in the above described conventional method, since the conversion of special characters and external characters is individually carried out every application by means of the code converting library or the like, it is required to manage the code converting library and mapping information every application, so that there is a problem in that character data miss when character data are exchanged between coding schemes other than coding schemes supported by the code converting library or when mapping information varies.

SUMMARY OF THE INVENTION

It is therefore an object of the present invention to eliminate the aforementioned problems and to provide a character code converting system in a multi-platform environment, which can lighten the burden imposed on the management of a code converting library and mapping information on the side of users and which can easily and surely convert codes between a plurality of different coding schemes with respect to character data including the types of characters such as special characters and external characters, and a computer readable recording medium in which a character code converting program for use in the character code converting system has been recorded.

In order to accomplish the aforementioned and other objects, according to a first aspect of the present invention, there is provided a character code converting system in a multi-platform environment, the character code converting system being realized in a multi-platform environment which includes a plurality of platforms having different coding schemes, respectively, and carrying out a code conversion of character data, which are exchanged between a plurality of processing programs operating on the platforms, respectively, by means of an internal code converting module, the character code converting system comprising: mapping information holding means for holding mapping information indicative of a corresponding relationship between character codes in a plurality of different coding schemes; external code converting means for carrying out a code conversion of character data, which are exchanged between the processing programs and the internal code converting module, on the basis of the mapping information; and data processing means for processing character data, which have been code-converted by the external code converting means, into a predetermined data format which will be code-converted by the internal code converting module.

In the above described character code converting system, the data processing means preferably processes the character data, which have been code-converted by the external code converting means, into a format of a character function procedure using the character data as an argument. The internal code converting module is preferably capable of carrying out a code conversion in which a lower 1 byte is taken out of a character code of 2 bytes, as well as a usual code conversion between the plurality of different coding schemes, and the data processing means preferably extracts character data, which have been code-converted by the external code converting means, byte by byte, and processes the extracted character data for each byte into a format of character data of 2 bytes including the character data as a lower 1 byte.

The mapping information holding means, the external code converting means and the data processing means are preferably realized on a user computer on which the processing programs operate. The user computer is connected to a management server via a communication medium, the management server including mapping information managing means for unified-managing mapping information, and mapping information distributing means for distributing the mapping information, which is managed by the mapping information managing means, to the user computer, and the user computer including mapping information updating means for updating the mapping information, which has been held in the mapping information holding means, on the basis of the mapping information which has been distributed by the mapping information distributing means of the management server. Preferably, the character code converting system further comprises: code conversion determining means for controlling the external code converting means and the data processing means in accordance with a setting status of the code conversion in the internal code converting module, the code conversion determining means controlling the external code converting means and the data processing means so as to carry out only the code conversion using the external code converting means when the code conversion in the internal code converting module is invalidated.

According to a second aspect of the present invention, there is provided a computer readable recording medium in which a character code converting program has been recorded, the character code converting program being realized in a multi-platform environment which includes a plurality of platforms having different coding schemes, respectively, and carrying out the code conversion of character data, which are exchanged between a plurality of processing programs operating on the platforms, respectively, by means of an internal code converting module, the character code converting program executing: a procedure for causing a computer, which realizes the platforms, to carry out the code conversion of character data, which are exchanged between the processing programs and the internal code converting module, on the basis of mapping information indicative of a corresponding relationship between character codes in a plurality of different coding schemes; and a procedure for causing the computer to process character data, which have been code-converted, into a predetermined data format which will be code-converted by the internal code converting module.

According to the first and second aspects of the present invention, the code conversion of character data, which are exchanged between the respective processing programs operating on the respective platforms and the internal code converting module, is carried out on the basis of mapping information, and the code-converted character data are processed into a predetermine data format which will be code-converted by the internal code converting module. Therefore, even if the internal code converting module is operating, it is possible to equivalently transmit character data, and it is possible to easily and surely carry out code conversions between a plurality of different coding schemes depending on the platforms, so that it is possible to treat the same character as a unique character. For that reason, even if character data include types of characters such as special characters (vendor-designed characters) and external characters (user-designed characters), it is possible to easily and surely carry out code conversions between a plurality of different coding schemes without missing the types of characters. In addition, since the data processing means and the external code converting means are separated from the processing program, the reusability of logic for use in these means is enhanced, so that it is possible to lighten the burden imposed on the management of the code converting library and mapping information on the side of users.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 10A and 10B are diagrams showing examples of processings at steps 403 and 408 shown in FIG. 9, respectively.

DESCRIPTION OF THE PREFERRED EMBODIMENTS

Figure 1:
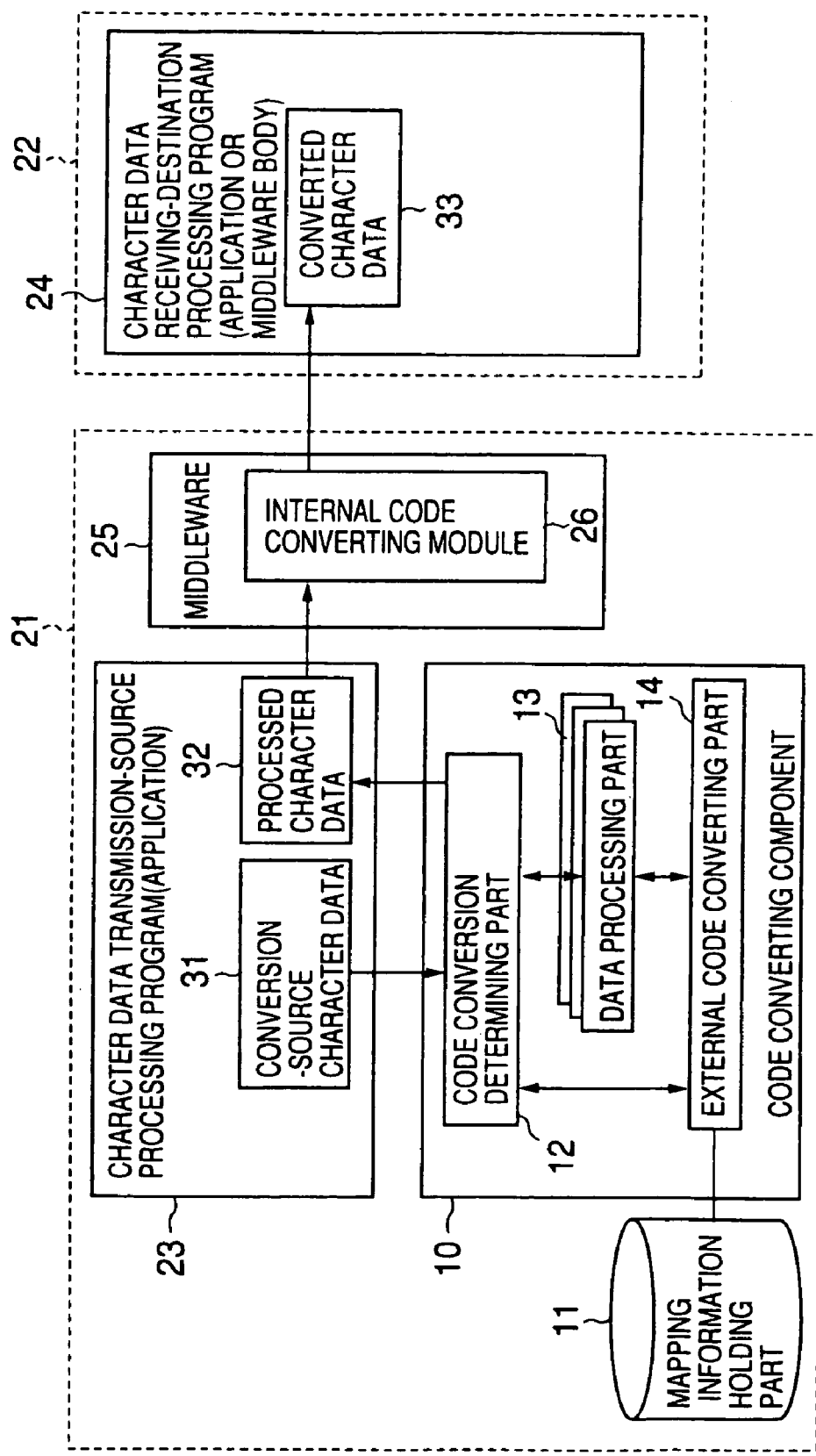
FIG. 1 is a block diagram for explaining a preferred embodiment of a character code converting system according to the present invention.
Figure 2:
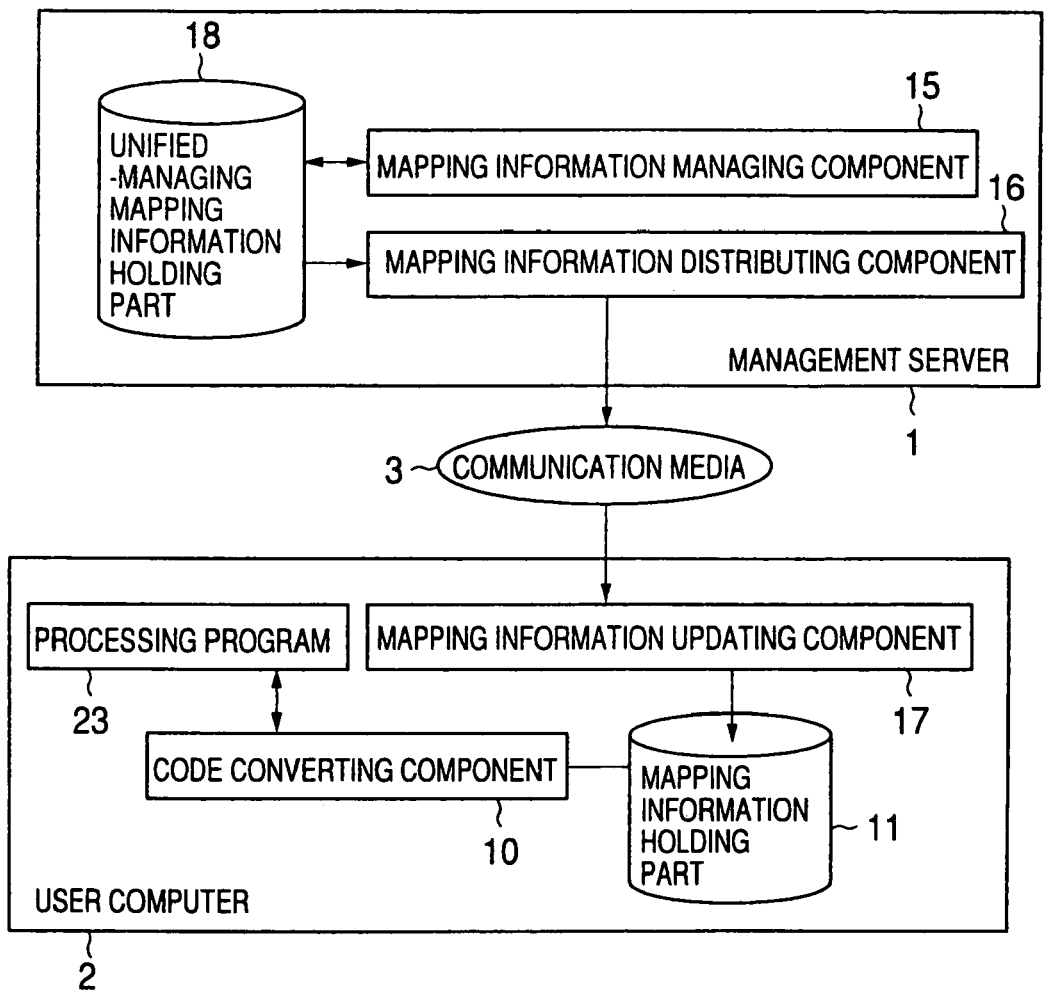
FIG. 2 is a block diagram showing the whole construction of a network system to which the character code converting system shown in FIG. 1 is applied.

Referring now to the accompanying drawings, the preferred embodiments of the present invention will be described below. FIGS. 1 and 2 show a preferred embodiment of a character code converting system according to the present invention.

As shown in FIG. 1, a character code converting system in this preferred embodiment is realized on a multi-platform environment including platforms 21 and 22. The platforms 21 and 22 have different coding schemes. In FIG. 1, reference number 23 denotes a processing program (application) which operates on the platform 21 and which is designed to transmit character data to another processing program. Reference number 24 denotes a processing program (application or middleware body) which operates on the platform 22 and which is designed to receive character data transmitted from the processing program 23. Reference number 25 denotes a middleware which is used when character data are exchanged between the processing programs 23 and 24 and which includes a data linkage function between processing programs, a communication function and so forth. When the processing program 24 is a middleware body such as a data base management system (DBMS), reference number 25 corresponds to a connection function portion to the middleware body. The middleware 25 has an internal code converting module 26 which can convert codes with respect to character data exchanged between the processing programs 23 and 24. Specifically, the internal code converting module 26 in the middleware 25 is designed to hold the corresponding relationship between the character codes in the coding schemes of the platforms 21 and 22 and to prepare converted character data 33 for the processing program 24 on the basis of character data in the processing program 23.

As shown in FIG. 1, the processing program 23 is connected to a code converting component 10 to carry out processes, such as the data conversion of character data (conversion source character data 31) transmitted from the processing program 23 and the processing of the character data to a predetermined data format. Processed data (processed character data 32) processed by the code converting component 10 are transmitted to the middleware 25 via the processing program 23 to be code-converted by the internal code converting module 26 in the middleware 25.

The code converting component 10 has a code conversion determining part 12, a data processing part 13 and an external code converting part 14. The external code converting part 14 is connected to a mapping information holding part 11.

The mapping information holding part 11 is designed to hold the corresponding relationship between character codes in a plurality of different coding schemes (the corresponding relationship between code values with respect to the same character in a plurality of different coding schemes) as mapping information. The external code converting part 14 is designed to make reference to the mapping information holding part 11.

The code conversion determining part 12 is designed to control the external code converting part 14 and the data processing part 13 in accordance with the setting status of code conversion in the internal code converting module 26 in the middleware 25. Specifically, the code conversion determining part 12 is designed to receive character data and parameters indicative of the contents of conversion from the processing program by calling the application programming interface (API) of the processing program 23, to control the external code converting part 14 and the data processing part 13 at request on the side of the processing program 23. That is, when it is set so that code conversion is carried out in the internal code converting module 26, character data and parameters are transmitted to the data processing part 13. Then, under the control of the data processing part 13, a code conversion is carried out by the external code converting part 14, and a processing to a predetermined data format is carried out by the data processing part 13. On the other hand, when the code conversion in the internal code converting module 26 is invalidated, character data and parameters are transmitted to the external code converting part 14, and only the code conversion using the external code converting part 14 is carried out. The parameters transmitted from the processing program 23 include the presence and kind of the processing in the data processing part 13, in addition to information indicative of the coding schemes of the transmission source and receiving destination.

The data processing part 13 is called by the code conversion determining part 12. On the basis of the character data and parameters transmitted from the processing program 23, the data processing part 13 is designed to cause the external code converting part 14 to carry out a code conversion, and to process the character data, which have been code-converted by the external code converting part 14, into a predetermined data format for use in a code conversion in the internal code converting module 26 as a premise.

The external code converting part 14 is not only called directly by the code conversion determining part 12, but it is also called by the data processing part 13. The external code converting part 14 is designed to code-convert the character data, which are exchanged between the respective processing programs 23, 24 and the internal code converting module 26, on the basis of the character data and parameters transmitted from the processing program 23. The code conversion in the external code converting part 14 is not only carried out on the basis of the mapping information held in the mapping information holding part 11, but it may also be carried out in accordance with a predetermined algorithm. Alternatively, the code conversion based on the mapping information may be combined with the code conversion based on the algorithm to carry out the code conversion in the external code converting part 14. When the code conversion based on the mapping information is combined with the code conversion based on the algorithm, precedence is preferably given as to which system is used for converting character codes in the overlapping range of both of the code conversions.

Referring to FIG. 2, an example of a network system to which the character code converting system shown in FIG. 1 is applied will be described below.

As shown in FIG. 2, the code converting component 10 (the code conversion determining part 12, the data processing part 13 and the external code converting part 14) and the mapping information holding part 11, which are shown in FIG. 1, are realized on a user computer 2 on which the processing program 23 operates. The user computer 2 is connected to a management server 1 via communication media 3 such as a local area network (LAN).

The management server 1 is designed to unified-manage mapping information which is held in a plurality of user computers 2 connected thereto via the communication media 3. The management server 1 includes a mapping information managing component 15 for unified-managing mapping information, and a mapping information distributing component 16 for distributing the mapping information, which is managed by the mapping information managing component 15, to the user computers 2. The mapping information managing component 15 is connected to a unified-managing mapping information holding part 18 in which the corresponding relationship between character codes in a plurality of different coding schemes (the corresponding relationship between code values with respect to the same character in a plurality of coding schemes) are held as mapping information. The mapping information managing component 15 can not only define and store mapping information held in the unified-managing mapping information holding part 18, but it can also request to distribute and update the mapping information to the user computers 2 when the mapping information held in the unified-managing mapping information holding part 18 is updated.

On the basis of the mapping information distributed by the mapping information distributing component 16 of the management server 1, the user computers 2 can update the mapping information, which is held in the mapping information holding part 11, by means of a mapping information updating component 17.

With this construction, the operation of this preferred embodiment will be described below. Although FIG. 1 shows only the state of the data conversion in the order of the processing program 23, the middleware 25 and the processing program 24, the same processing can also be carried out when the data conversion is carried out in the order of the processing program 24, the middleware 25 and the processing program 23.

In FIG. 1, the processing program 23 transmits character data to the processing program 24 via the middleware 25.

At this time, the processing program 23 transmits the conversion source character data 31 to the code converting component 10. The processing program 23 transmits parameters indicative of the contents of the conversion (information indicative of the coding schemes of the transmission source and receiving destination, and the need for the processing in the data processing part 13 (and information indicative of the kind of the processing if the processing is necessary)), together with the character data.

The code converting component 10 carries out processes such as the data conversion of the conversion source character data 31 and the processing to a predetermined data format.

The processes carried out by the code converting component 10 are different in accordance with the kind of the middleware linking with the processing program 23. In accordance with the kind of the middleware, it is determined whether the code conversion of the conversion source character data 31 and the processing to the predetermined data format are carried out or only the code conversion is carried out. That is, when it is set so that the code conversion is carried out in the internal code converting module 26 in the middleware 25, it is not required to only carry out the code conversion in the external code converting part 14, but it is also required to carry out the processing to the predetermined data format in the data processing 13 for use in the code conversion in the internal code converting module 26 as a premise. On the other hand, when the internal code converting module 26 provided in the middleware 25 has been invalidated or when the internal code converting module 26 is not provided in the middleware 25, it is required to carry out only the code conversion in the external code converting part 14.

First, in the code conversion determining part 12, on the basis of the parameters transmitted from the processing program 23, it is determined whether it is required to carry out the processing in the data processing part 13.

When the code conversion is carried out in the internal code converting module 26, it is required to carry out the processing in the data processing part 13 and the code conversion in the external code converting part 14. In this case, the character data and parameters are transmitted to the data processing part 13. Then, under the control of the data processing part 13, on the basis of the mapping information held in the mapping information holding part 11, the external code converting part 14 is caused to code-convert the character data. Thereafter, the character data thus code-converted are processed by the data processing part 13 into a predetermined data format for use in the code conversion in the internal code converting module 26 as a premise. The converted results are transmitted to the processing program 23 as the processed character data 32.

On the other hand, the code conversion in the internal code converting module 26 is invalidated, the character data and parameters are transmitted to the external code converting part 14 to carry out only the code conversion using the external code converting part 14. The converted results are returned to the processing program 23 as the processed character data 32.

Thereafter, the processing program 23 transmits the processed character data 32, which are transmitted from the code converting component 10, to the processing program 24 via the middleware 25. At this time, when it is set so that the code conversion is carried out in the middleware 25, the code conversion of the processed character data 32 transmitted from the processing program 23 is carried out by the internal code converting module 26, and then, the converted processed character data are transmitted to the processing program 24 as the converted character data 33. On the other hand, when the internal code converting module 26 provided in the middleware 25 has been invalidated or when the internal code converting module 26 is not provided in the middleware 25, the processed character data 32 transmitted from the processing program 23 are transmitted directly to the processing program 24.

Figure 3:
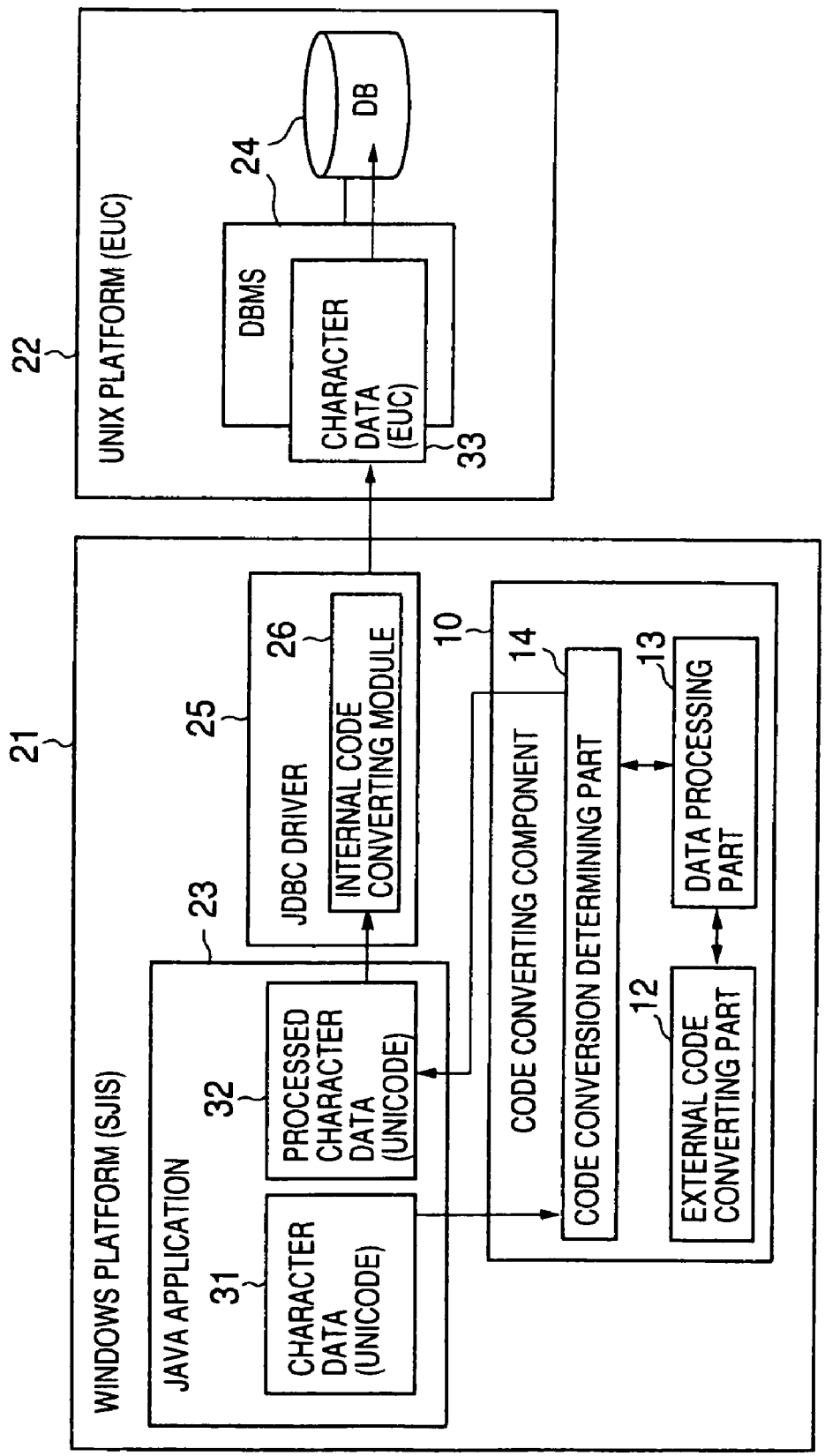
FIG. 3 is a block diagram showing a preferred embodiment of a data base management system (DBMS) to which the character code converting system shown in FIG. 1 is applied.

FIG. 3 is a block diagram for explaining a preferred embodiment of a data base management system (DBMS) to which the character code converting system shown in FIG. 1 is applied. In FIG. 3, as a processing program of a source for transmitting character data, a Java application 23 which operates on a Windows platform 21 and which has been developed by Java language is used. As a processing program of a destination for receiving the character data, a data base management system (DBMS) 24 operating on a UNIX platform 22 is used.

As the middleware, there is a JDBC driver 25 for accessing the DBMS 24. Character data are inserted into the DBMS 24 from the Java application 23 via the JDBC driver 25. When the character data are inserted into the DBMS 24 from the Java application 23, an SQL sentence (character data) issued from the Java application 23 is code-converted from the coding scheme (Unicode) on the side of the Java application 23 into the coding scheme (EUC) on the side of the DBMS 24 by means of the internal code converting module 26 built in the JDBC driver 25.

(Processing Example 1)

Referring to FIGS. 4 to 7, a first processing example for character data in the preferred embodiment shown in FIG. 3 will be described below. In this first processing example, the data processing part 13 processes character data, which have been code-converted by the external code converting part 14, into the format of a character function procedure using the character data as an argument.

In the first processing example, it is supposed that the types of characters, such as special characters and external characters, which depend on a specific platform, are included in character data which are inserted from the Java application 23 into the DBMS 24. It is assumed that the code converting component 10 has held the corresponding relationship with respect to these types of characters between Unicode and EUC in the mapping information holding part 11 as mapping information, and can code-convert these types of characters from Unicode to EUC by means of the external code converting part 14. The internal code converting module 26 in the JDBC driver 25 does not correspond to these types of characters.

Figures 4, 5:
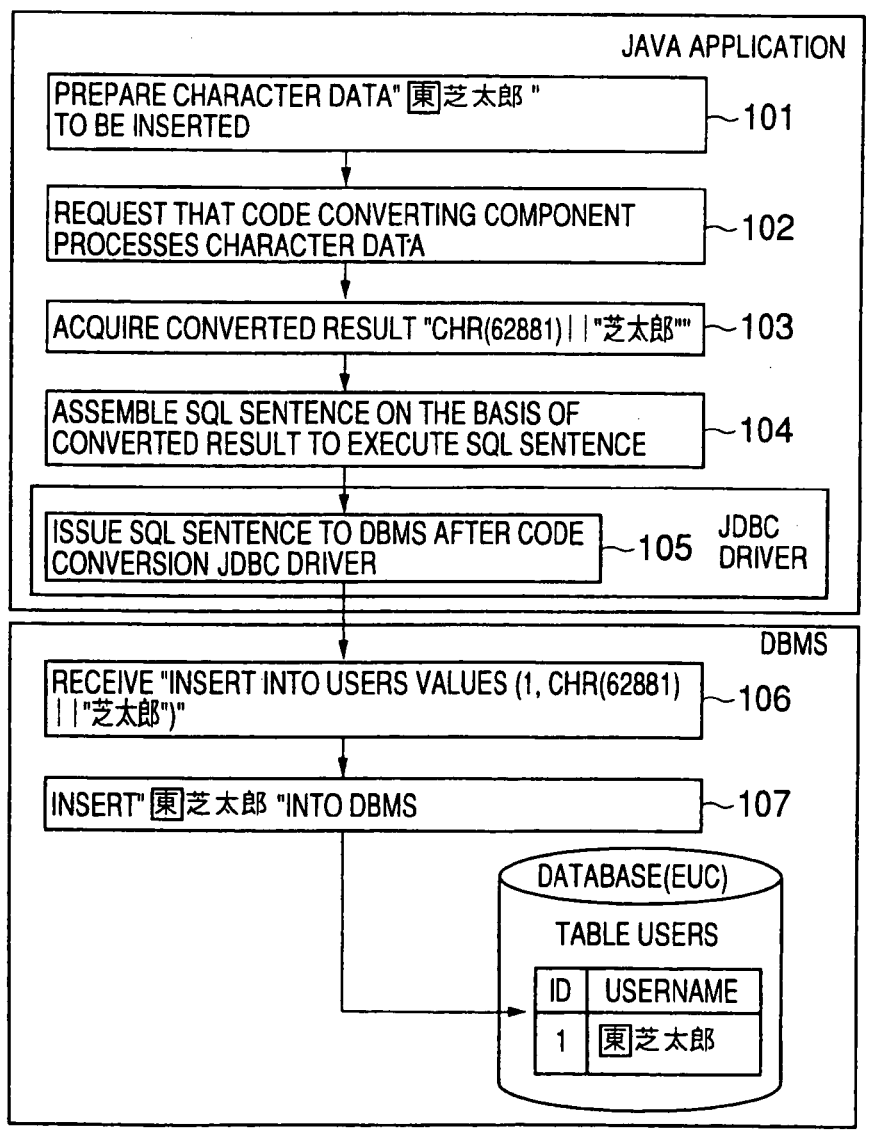
FIG. 4 is a table showing an example of mapping information between Unicode and EUC in the preferred embodiment shown in FIG. 3.
FIG. 5 is a flow chart for explaining an example of a character data processing flow in the preferred embodiment shown in FIG. 3.

In an example where a character string "園芝太郎" is inserted into the DBMS 24 from the Java application 23, the flow of a processing for character data in the code converting component 10 will be described. Incidentally, the character string "園 芝太郎" consists of four Chinese characters "園", "芝", "太" and "郎". FIG. 4 shows an example of mapping information for the character string "園芝太郎". In FIG. 4, the character "園" of the character string "園芝太郎" is an external character (user-designed character). On Unicode, the character "園" is expressed by a code value "0xE000" positioned at its private region, and on EUC serving as a code-converting object, the character "園" is expressed by a code value "0xF5A1" positioned at the free region of EUC code set 1.

As shown in FIG. 5, first, the Java application 23 prepares character data "園芝太郎" inserted from the Java application 23 (step 101).

Then, the Java application 23 transmits the character data "園芝太郎" to the code converting component 10 to request a data conversion and a processing to a data format (step 102). Thus, the Java application 23 acquires the converted result "CHR (62881) ∥ "芝太郎" (step 103). Furthermore, "CHR (XXXXX)" is a character function procedure which can be recognized in the DBMS 24 and which express data for a single character using an argument "XXXXX" as a code value. Furthermore, it is assumed that "XXXXX" is expressed by decimal notation. For example, "CHR (41377)" expresses a character having a code value "41377 (0xA1A1)" to express a character at a point in an area of the EUC code set 1.

Thereafter, the Java application 23 assembles an SQL sentence "INSERT INTO USERS VALUES (1, CHR (62881) ∥ "芝太郎")" on the basis of the converted result to execute the SQL sentence.

Thus, the JDBC driver 25 issues the SQL sentence to the DBMS 24 (step 105). At this time, the code conversion from Unicode to EUC is carried out by the internal code converting module 26 in the JDBC driver 25. Since the external character "圀" as a matter is character data processed so as to become a character function procedure, and since all of the characters included in the character data (CHR (62881)) are expressed by 1-byte code, the external character can be transmitted as character data which can be normally recognized as EUC external characters ("0xF5A1") on the side of the DBMS 24.

The DBMS 24 receives the SQL sentence "INSERT INTO USERS VALUES (1, CHR (62991) ∥ "芝太郎")" (step 106), and thereafter, inserts EUC character data "圀芝太郎" into the data base (step 107).

On the other hand, when the retrieved results on the side of the DBMS 24 are acquired by the Java application 23, the character data can be processed using the function procedure on the side of the DBMS 24. Specifically, for example, when a function (HEX (XXXXX)) restoring a decimal character string of code values exists as a function procedure on the side of the DBMS 24, the retrieved results are acquired by the SQL such as "SELECT HEX (XXXXX) FROM USERS", and the external code converting part 14 of the code converting component 10 code-converts code values, which are indicated by the decimal character string "XXXXX" of the "HEX (XXXXX)", from EUC to Unicode, so that it is possible to acquire character data including the types of characters such as external characters and special characters.

Figure 6:
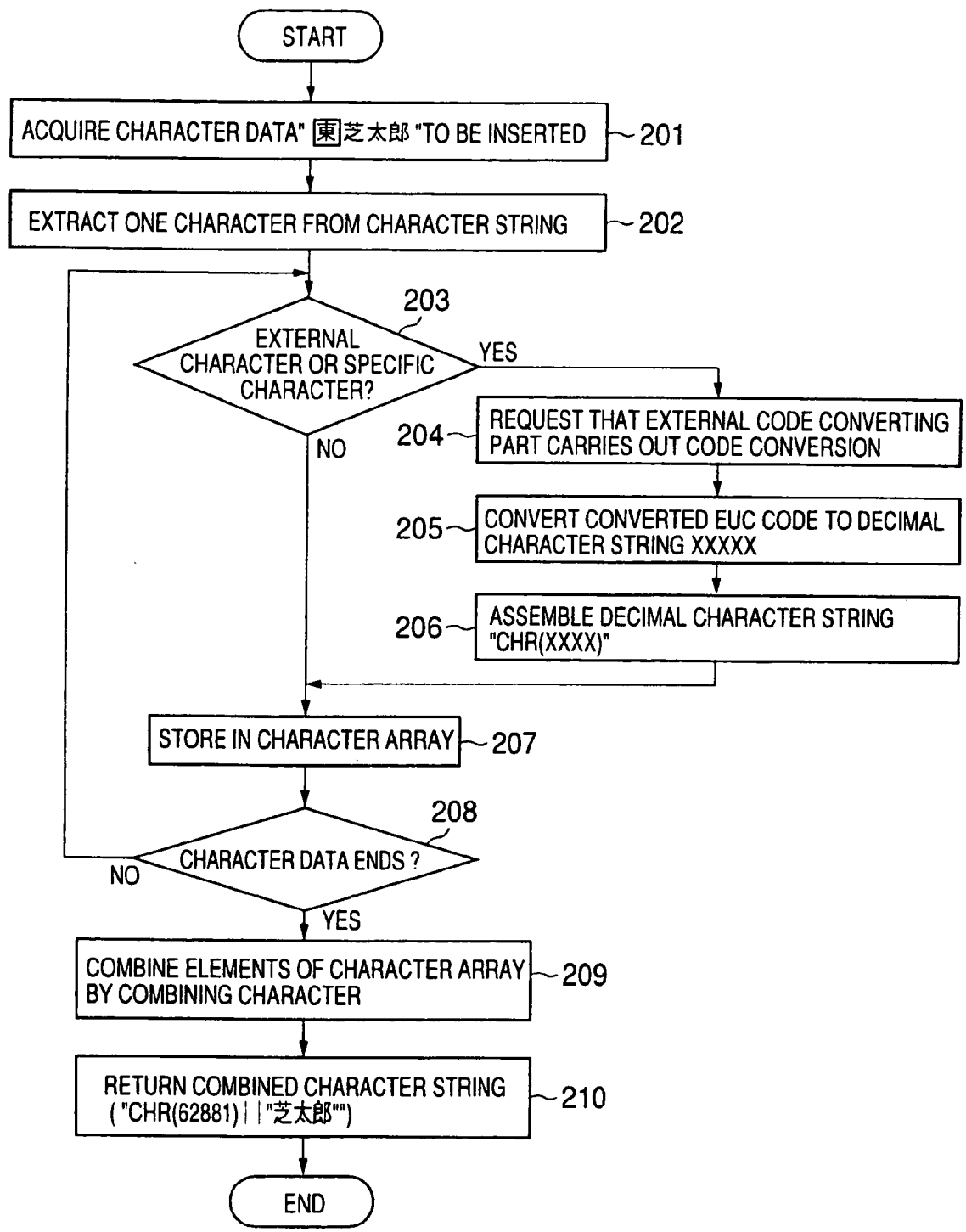
FIG. 6 is a flow chart for explaining an example of a data processing method in the example shown in FIG. 5.
Figure 7:
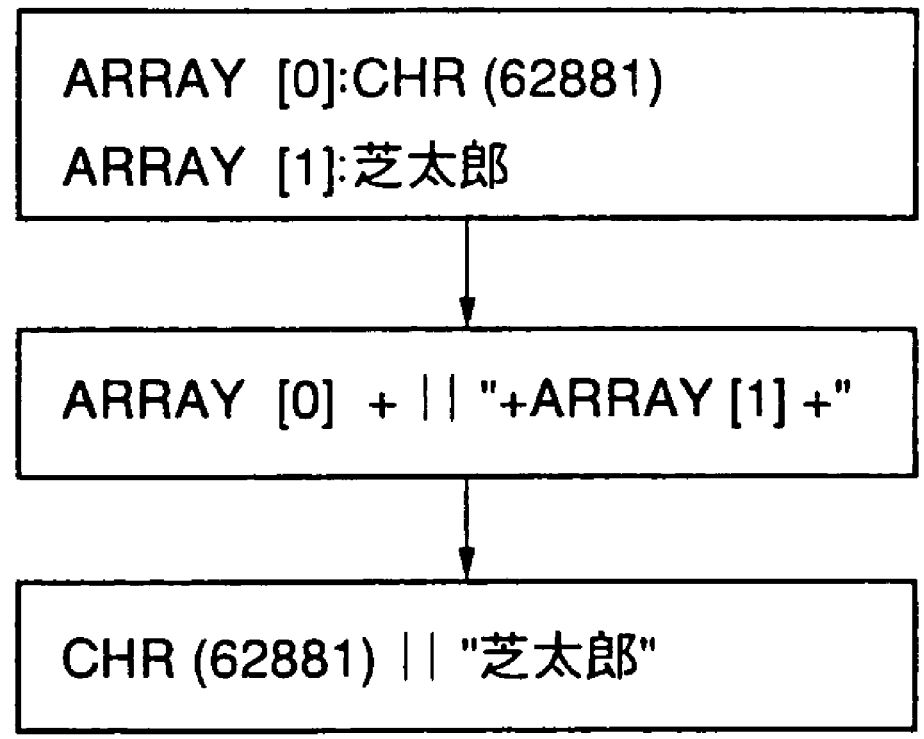
FIG. 7 is a flow chart showing an example of a processing at step 209 shown in FIG. 6.

FIGS. 6 and 7 are flow charts for explaining an example of a data processing method in the example shown in FIG. 5. As shown in FIG. 6, when the data processing part 13 of the code converting component 19 acquires character data "圀芝太郎" from the Java application 23 (step 201), the data processing part 13 extracts characters one by one from the character data "圀芝太 郎(step 202), and determines whether the extracted character is an external character or a specific character (step 203).

When it is determined at step 203 that the extracted character is an external character or a special character, the external code converting part 14 is requested for carrying out a code conversion to acquire the converted results (step 204).

Thereafter, the converted EUC code values are converted into a decimal character string "XXXXX" (step 205), and then, a character string "CHR (XXXXX)" using the decimal character string "XXXXX" as an argument is assembled (step 206). The code value "0xF5A1" of EUC corresponding to the characters "圀" of the character data "圀芝太郎" is herein converted into a decimal character string "62881" to be assembled as a character string "CHR (62881)" to be stored in the character array [0] (step 207).

On the other hand, when it is determined at step 203 that the extracted character is not an external character or a special character, the extracted character is sequentially stored in the character array [1] (step 207), and repeatedly stored in the character array [1] until an external character or a special character is detected again. Although an external character herein appears only at the beginning of the character string, the element of the character string is counted up to be stored in the subsequent character array [2] if an external character or a special character is detected again.

When the processing at steps 201 to 207 is carried out with respect to all of characters in the character data "圀芝太郎" (step 208), "CHR (62881)" is finally stored in the character array [0], and "芝太郎" is stored in the character array [1].

Finally, the character strings in each array element divided into an element of a character string included in a character function procedure indicative of external characters or specific characters and an element of other character strings are combined via combining characters (step 209), and the combined character string "CHR (62881) ∥ "芝太郎" is returned (step 210). The state of combination of the character array [0] with the character array [1] is shown in FIG. 7.

(Processing Example 2)

Figure 8:
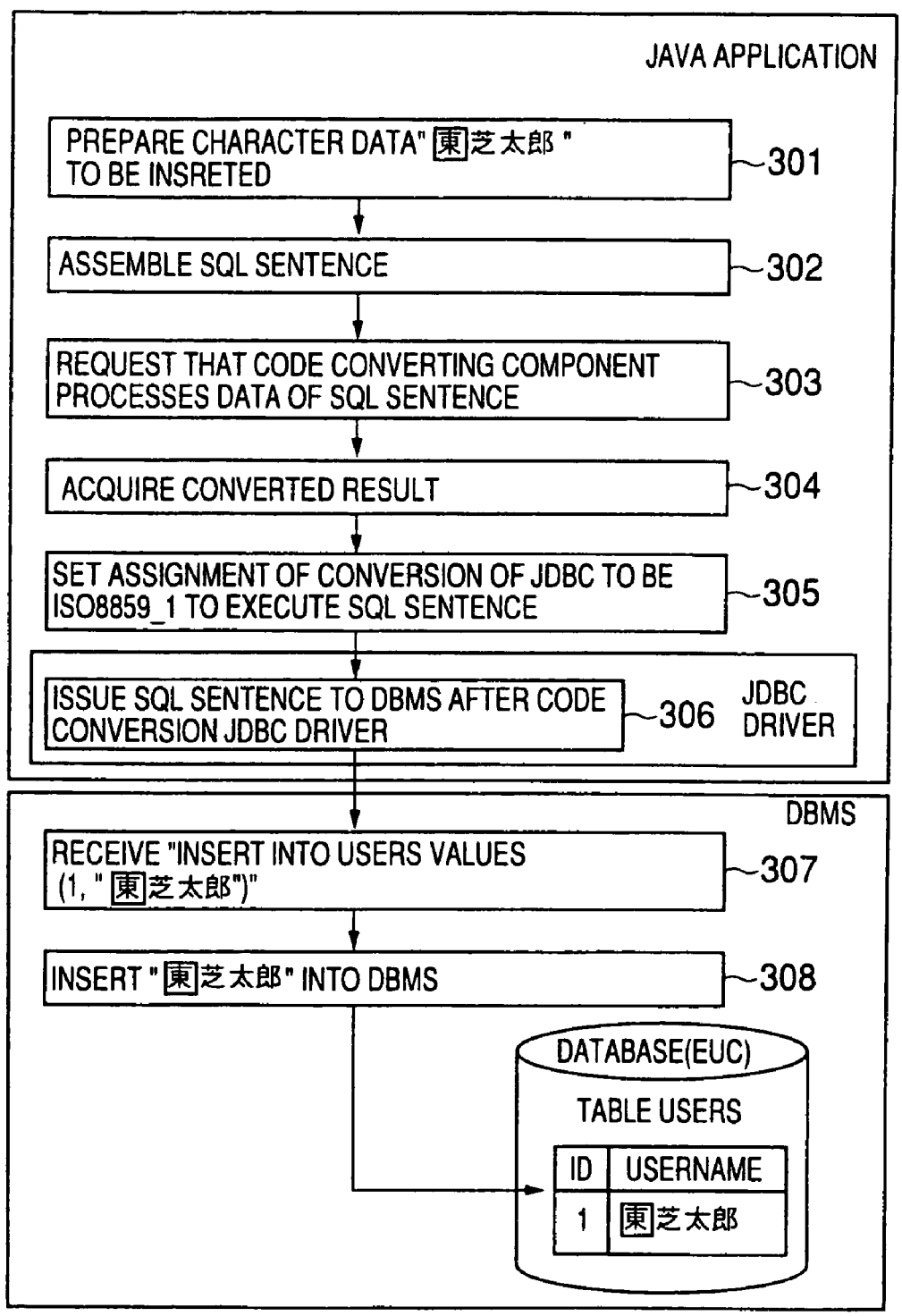
FIG. 8 is a flow chart for explaining another example of a character data processing flow in the preferred embodiment shown in FIG. 3.
Figure 9:
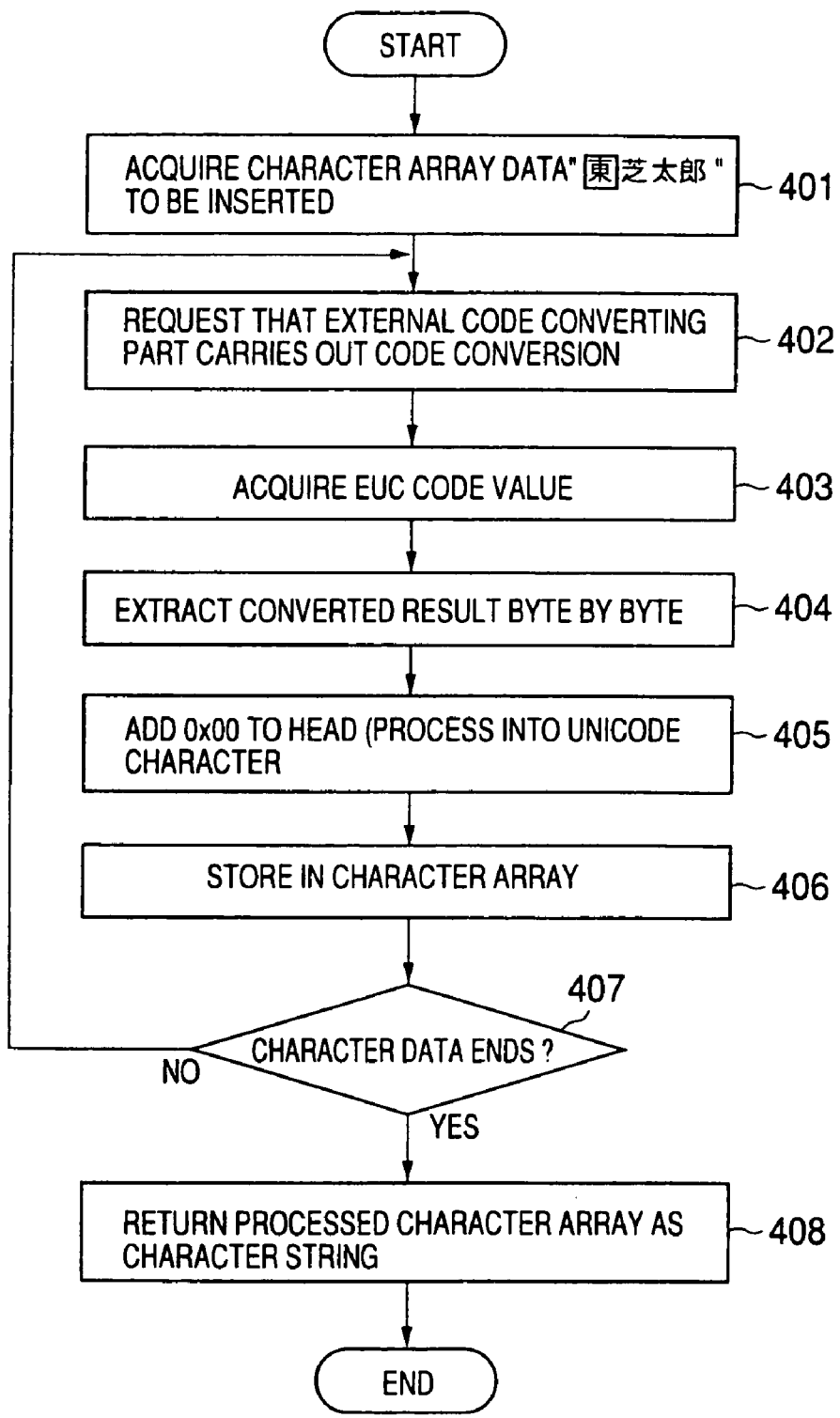
FIG. 9 is a flow chart for explaining an example of a data processing method in the example shown in FIG. 8.

Referring to FIGS. 8 to 10, a second processing example for character data in the preferred embodiment shown in FIG. 3 will be described below. In this second processing example, the data processing part 13 extracts character data, byte by byte, which have been code-converted by the external code converting part 14, and processes the extracted character data for each byte into the format of character data for each two bytes which use the character data for each byte as a lower byte.

Also in the second processing example, it is supposed that the types of characters, such as special characters and external characters, which depend on a specific platform, are included in character data which are inserted from the Java application 23 into the DBMS 24. It is assumed that the code converting component 10 has held the corresponding relationship with respect to these types of characters between Unicode and EUC in the mapping information holding part 11 as mapping information, and can code-convert these types of characters from Unicode to EUC by means of the external code converting part 14. Although the internal code converting module 26 in the JDBC driver 25 does not correspond to these types of characters, the internal code converting module 26 can select another code conversion (ISO8859_1 which is a 1-byte encoding system), other than the code conversion between Unicode and EUC. The ISO8859_1 which is the 1-byte encoding system is designed to take only lower one byte out of character code of 2 bytes, and can take the portion of code values "0x00" through "0XFF" of lower bytes out of the individual character code included in the character data of Unicode.

As shown in FIG. 8, first, the Java application 23 prepares character data "圀芝太郎" inserted from the Java application 23 (step 301).

Then, the Java application 23 assembles an SQL sentence "INSERT INTO USERS VALUES (1, "圀芝太郎")" on the basis of the character data "圀芝太郎" (step 302). Thereafter, the Java application 23 requests to the code converting component 10 the data conversion of the whole SQL sentence and the processing of the whole SQL sentence to a predetermined data format (step 303). Thus, the Java application 23 acquires the converted results (step 304). The acquired converted results are Unicode character data of 2 bytes which are obtained by extracting a code value, which has been converted into EUC being the coding scheme on the side of the DBMS 24, byte by byte to add "0x00" to the head portion of the extracted code value.

Thereafter, the Java application 23 assigns ISO8859_1, which is a 1-byte encoding system, to the internal code converting module 26 in the JDBC driver 25 to execute the SQL sentence (step 305).

Thus, the JDBC driver 25 issues the SQL sentence to the DBMS 24 (step 306). At this time, the internal code converting module 26 in the JDBC driver 25 removes the code value "0x00" of the head 1 byte of the individual character code included in the Unicode character data, and the portions of the code values "0x00" through "OXFF" of lower bytes (EUC code values) are taken out as they are. Therefore, even if the internal code converting module 26 in the JDBC driver 25 does not correspond to the types of characters such as external characters and special characters, the external characters "圏" as a matter can be transmitted as character data which can be normally recognized as EUC external characters (0XF5A1).

In the DBMS 24, after the SQL sentence "INSERT INTO USERS VALUES (1, "圏芝太郎")" is received (step 307), EUC character data "圏芝太郎" are inserted into the database (step 308).

When the Java application 23 acquires the retrieved results on the side of the DBMS 24, the internal code converting module 26 in the JDBC driver 25 extracts the EUC code values byte by byte under ISO8859_1 which is the 1-byte encoding system, and returns the Unicode character data to the head portion of which "0x00" has been added. Therefore, if the data processing part 13 of the code converting component 10 removes the head portion "0x00" of the character code of 2 bytes included in the Unicode character data to prepare a byte array of 1 byte and if the external code converting part 14 code-converts the byte array into Unicode, it is possible to acquire character data including the types of characters such as external characters and special characters.

FIGS. 9 and 10 are flow charts for explaining an example of a data processing method in the example shown in FIG. 8. As shown in FIG. 9, when the data processing part 13 of the code converting component 10 acquires character data "圏芝太郎" from the Java application 23 via the code conversion determining part 12 (step 401), the data processing part 13 requests that the external code converting part 14 carries out the code conversion of the character data "圏芝太郎" (step 402), and acquires the converted results as EUC code values (step 403). At this time, the converted EUC code values corresponding to the character data "圏芝太郎" have been stored in the form of a byte array shown in FIG. 10A.

Thereafter, the converted EUC code values are extracted byte by byte to add "0x00" to their head portions to prepare Unicode character data of 2 bytes (step 405).

The Unicode character data thus prepared are stored in a character array (step 406).

Finally, when the processing at steps 401 to 405 is carried out with respect to all of characters in the character data "圏", 芝太郎 the character data are stored in the character array as shown in FIG. 10B, and the processed character array is returned (step 408). As shown in FIG. 10B, for example, the EUC code value "0xF5A1" is stored in the character arrays [0] and [1] as Unicode character codes "0x00F5" and "0x00A1", respectively, and the processed character arrays are returned.

In this second processing example, it is presupposed that the internal code converging module 26 in the JDBC driver 25 can assign ISO8859_1 which is the 1-byte encoding system. However, as compared with the above described first processing example wherein the character function procedure is incorporated into the SQL sentence, there are advantages in that it is not required to determine the presence of external characters and special characters and that it is required to carry out any code conversions depending on the specification on the side of the DBMS 24, such as character function procedures.

As described above, according to this preferred embodiment, the code conversion of character data, which are exchanged between the respective processing programs 23, 24 operating on the respective platforms 21, 22 and the internal code converting module 26 in the middleware 25, is carried out on the basis of mapping information, and the code-converted character data are processed into a predetermined data format which will be code-converted by the internal code converting module 26. Therefore, even if the internal code converting module 26 in the middleware 25 is operating, it is possible to equivalently transmit character data, and it is possible to easily and surely carry out code conversions between a plurality of different coding schemes depending on the platforms 21 and 22, so that it is possible to treat the same character as a unique character. For that reason, even if character data include types of characters such as special characters (vendor-designed characters) and external characters (user-designed characters), it is possible to easily and surely carry out code conversions between a plurality of different coding schemes without missing the types of characters. In addition, since the code converting component 10 (the data processing part 13 and the external code converting part 14) is separated from the processing program 23, the reusability of logic for use in the code converting component 10 is enhanced, so that it is possible to lighten the burden imposed on the management of the code converting library and mapping information on the side of users.

According to this preferred embodiment, the mapping information is unified-managed by the mapping information managing component 15 of the management server 1 and distributed to the user computer 2 by the mapping information distributing component 16, and finally, the mapping information having been held in the mapping information holding part 11 is updated by the mapping information updating component 17 on the side of the user computer 2. Therefore, the mapping information can be unified between the plurality of user computers 2 connected to each other via the communication media 3, so that the corresponding relationship between the code values with respect to the same character in the plurality of coding schemes can be unique on all of the user computers 2.

In the above described preferred embodiment, each of the code converting component 10, the mapping information component 15, the mapping information distributing component 16 and the mapping information managing component 17 can be realized as program components operating on the user computers 2. A character code converting program including such program components is recorded in various recording media, and read out by the user computers 2 to carry out the above described processing.

Figure 11:
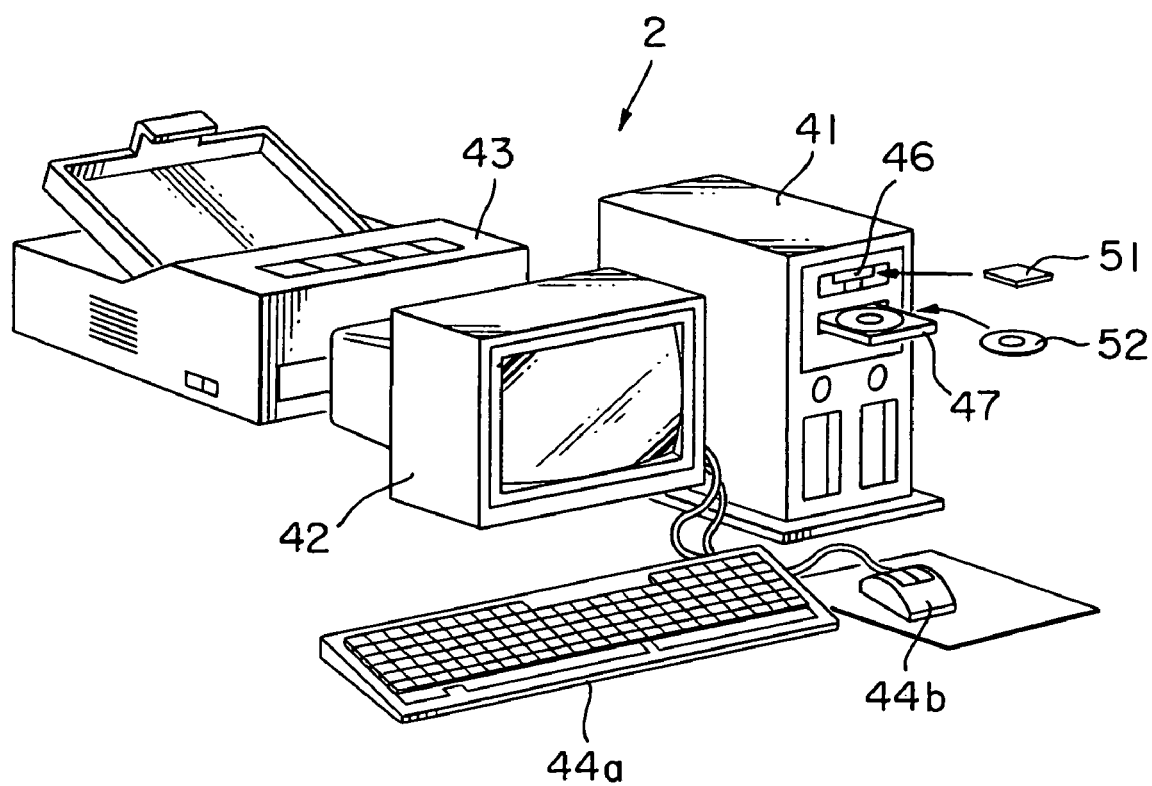
FIG. 11 is a perspective view showing the appearance of a computer system in which the character code converting system shown in FIG. 1 is realized.

FIG. 11 shows an example of a user computer 2 in which the above-mentioned character code converting program is installed. As shown in FIG. 11, the user computer 2 includes: a computer body 41 housed in a housing, such as a mini tower; a display unit 42, such as a cathode ray tube (CRT); a printer 43 serving as a recording output unit; a keyboard 44a and mouse 44b serving as input units; a floppy disk drive unit 46 for reading data out of the floppy disk 51 serving as a recording medium; and a CD-ROM drive unit 47 for reading data out of the CD-ROM 52 serving as a recording medium. In addition, an internal memory (not shown), such as a random access memory (RAM), and a hard disk unit (not shown) are provided in the computer body 41.

The recording media for use in the preferred embodiment include not only floppy disks and CD-ROMs, but also magnetic disks, hard disks, other optical disks (CD-R, DVD, etc.), optical magnetic disks (e.g., MO) and semiconductor memories. The recording media may have any recording forms if they can record programs and can be read by computers. The recording media also include data transmission media, such as carrier waves for transmitting data on a network. Moreover, the recording media should not be limited to recording media independent of computers, but they include recording media in which a program transmitted via LAN, Internet or the like has been downloaded to be stored or temporarily stored. The present invention should not be limited to the use of a single recording medium, but the concept of the recording media according to the present invention includes a case where the processing in the preferred embodiment is carried out by means of a plurality of recording media.

According to the present invention, a part of the processing carried out in this preferred embodiment can be realized by another program (a middleware or the like), such as an operating system (OS) operating on a computer, a data base management software or a network software, on the basis of the instruction of a character code converting program installed in the computer from the recording medium.

As described above, according to the present invention, it is possible to lighten the burden imposed on the management of the code converting library and mapping information on the side of users, and it is possible to easily and surely carry out the code conversion of character data including types of characters, such as special characters and external characters, between a plurality of coding schemes.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A character code converting system realized in a multi-platform environment including a plurality of platforms respectively having different coding schemes, comprising:
an internal code converting module carrying out a code conversion of character data, which are exchanged between a plurality of processing programs operating on said platforms;
a mapping information holding part configured to hold mapping information indicative of a corresponding relationship between a character code included in a coding scheme of a transmission-source-side processing program, and a character code included in a coding scheme of a receiving-destination-side processing program;
an external code converting part configured to carry out a code conversion of character data, which are to be exchanged between said transmission-source-side processing program and said receiving-destination-side processing program through said internal code converting module, so as to produce code-converted character data on the basis of said mapping information; and
a data processing part configured to process said code-converted character data to obtain processed character data in a predetermined data format, such that said processed character data can be equivalently transmitted from said transmission-source-side processing program to said receiving-destination-side processing program through said internal code converting module, even when the code conversion of said internal code converting module is being carried out.

2. A character code converting system as set forth in claim 1, wherein said data processing part processes said code-converted character data to obtain processed character data in a format of a character function procedure including said code-converted character data as an argument.

3. A character code converting system as set forth in claim 2, wherein said external code converting part and said data processing part carry out a code conversion of a character code of a type, which is not able to be code-converted by said internal code converting module, and a processing of said character code into a predetermined data format, respectively.

4. A character code converting system as set forth in claim 1, wherein said internal code converting module is configured to carry out a code conversion in which a lower 1 byte is taken out of a character code of 2 bytes, as well as a usual code conversion between said different coding schemes, and
said data processing part extracts said code-converted character data, byte by byte, and processes the extracted character data for each byte to obtain processed character data in a format of character data of 2 bytes including the extracted character data as a lower 1 byte.

5. A character code converting system as set forth in claim 1, wherein said mapping information holding part, said external code converting part, and said data processing part are realized on a user computer on which said processing programs operate,
said user computer being connected to a management server via a communication medium,
said management server including a mapping information managing part configured to update mapping information, and a mapping information distributing part configured to distribute said mapping information, which is managed by said mapping information managing part, to said user computer, and
said user computer including a mapping information updating part configured to update said mapping information, which has been held in said mapping information holding part, on the basis of said mapping information distributed by said mapping information distributing part of said management server.

6. A character code converting system as set forth in claim 1, further comprising:
a code conversion determining part configured to control said external code converting part and said data processing part in accordance with a setting status of the code conversion in said internal code converting module, said code conversion determining part controlling said external code converting part and said data processing part so as to carry out only the code conversion using said external code converting part when the code conversion in said internal code converting module is invalidated.

7. A computer readable recording medium in which a character code converting program has been recorded, said character code converting program being realized in a multi-platform environment including a plurality of platforms respectively having different coding schemes, said character code converting program executing:

a procedure for causing an internal code converting module to carry out a code conversion of character data exchanged between a plurality of processing programs operating on said platforms;

a procedure for causing a computer, which realizes said platforms, to carry out a code conversion of character data, which are to be exchanged between a transmission source-side processing program and a receiving-destination-side processing program through said internal code converting module, so as to produce code-converted character data, on the basis of mapping information indicative of a corresponding relationship between a character code included in a coded scheme of said transmission-source-side processing program, and a character code included in a coding scheme of said receiving-destination-side processing program; and a procedure for causing said computer to process said code-converted character data to obtain processed character data in a predetermined data format, such that said processed character data can be equivalently transmitted from said transmission-source-side processing program to said receiving-destination-side processing program through said internal code converting module, even when the code conversion of said internal code converting module is being carried out.

8. A computer readable recording medium as set forth in claim 7, wherein a part of said procedures are realized by another program executed on said computer, and said character code converting program includes an instruction for calling said part of said procedures realized by said other program.

\* \* \* \* \*